R. E. GARRETT.
SCALE.
APPLICATION FILED MAR. 22, 1916.
1,211,568.
Patented Jan. 9, 1917.
2 SHEETS—SHEET 1.
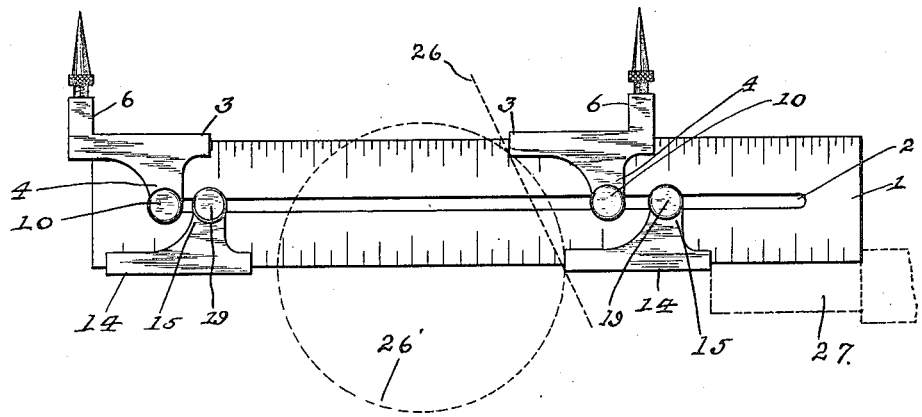
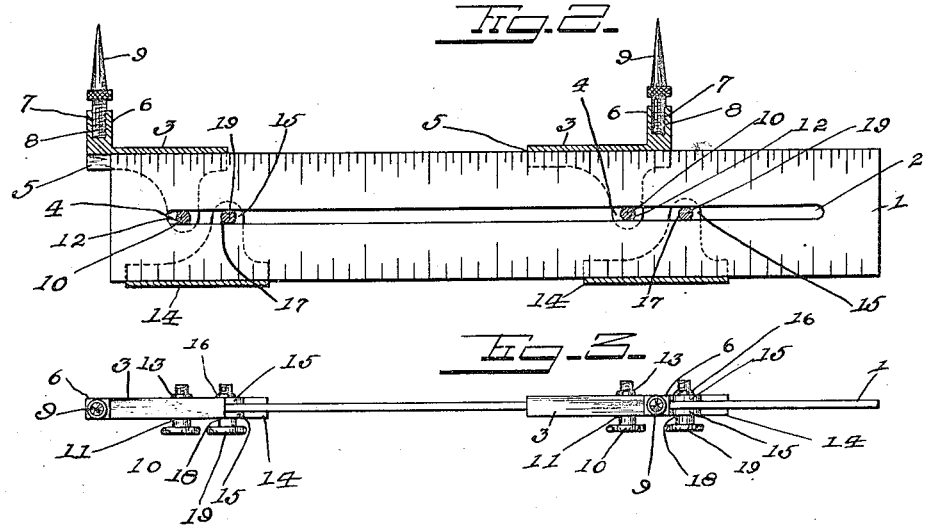
Robert E. Garrett,
Inventor
Witnesses
Ira M. Jones.
M. E. Moore
By _____
Attorney

R. E. GARRETT.
SCALE.
APPLICATION FILED MAR. 22, 1916.

1,211,568.

Patented Jan. 9, 1917.
2 SHEETS—SHEET 2.

Robert E. Garrett
Inventor

Witnesses
Ira M. Jones
M. E. Moore

By
Attorney

UNITED STATES PATENT OFFICE.

ROBERT E. GARRETT, OF NASHVILLE, TENNESSEE.

SCALE.

1,211,568.　　　　Specification of Letters Patent.　　　Patented Jan. 9, 1917.

Application filed March 22, 1916. Serial No. 85,820.

*To all whom it may concern:*

Be it known that I, ROBERT E. GARRETT, a citizen of the United States, residing at Nashville, in the county of Davidson and State of Tennessee, have invented certain new and useful Improvements in Scales, of which the following is a specification.

My invention relates to improvements in scales, and refers particularly to what may be termed a combination scale.

One object of my invention is the provision of a scale which will be capable of use in the measuring and laying out of work, both angular, circular and straight.

A further object of my invention is the provision of a scale for the purpose stated which will efficiently perform all the functions for which it is intended and which will be simple in construction and inexpensive to manufacture.

With the above and other objects in view which will appear as the description proceeds, the invention consists in the novel construction, combination and arrangement of parts, hereinafter described and claimed, it being understood that changes in the precise embodiment of the invention herein disclosed can be made without departing from the spirit of the invention.

In the accompanying drawings I have illustrated one complete example of the physical embodiment of my invention constructed according to the best mode I have so far devised for the practical application of the principles of my invention.

Figure 4:
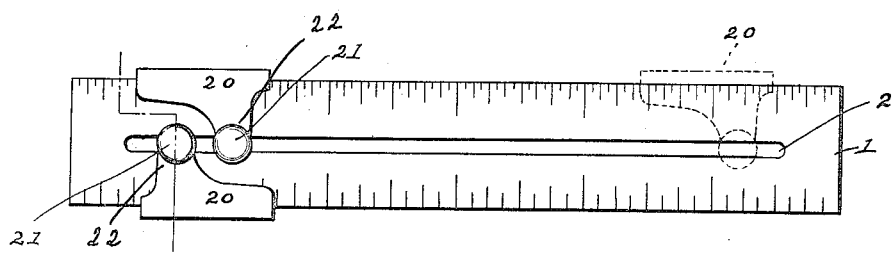
Figure 5:
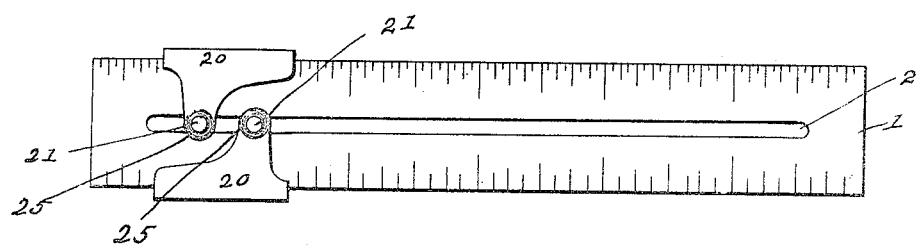
Figures 6, 7:
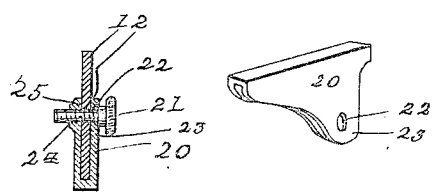

Figure 1 is a side elevation of the complete invention. Fig. 2 is a central sectional view thereof, the scale and scribing points being in elevation. Fig. 3 is a top plan view thereof. Fig. 4 is a side elevation of a modified form of my invention. Fig. 5 is a view in elevation of the reverse side thereof. Fig. 6 is a sectional view taken on line 6—6 of Fig. 4, and Fig. 7 is a perspective view of the novel stop or slide which I employ.

The invention consists in certain novel stops or slides which are used in connection with an ordinary mechanic's steel scale 1, which has in its center the slot 2, the distance between the ends of the slot and the ends of the scale being equal to that between the sides of the slot and the sides of the scale.

Mounted on one side of the scale is the set of slides 3, each constructed with the pair of ears 4, which extend over the slot 5, and with the projection 6 having in its top the threaded opening 7 to receive the threaded end 8 of the point 9, similar to that of dividers, the points 9 being capable of instant removal when the work does not require them. The points 9 may be used in any desired way such as dividers or in scribing a circle, etc. To secure the slides 3 in the desired adjustment I employ the knurled screws 10 which pass through the openings 11 in one of the ears 4 of the slides and the slot 2 and then engage the threaded opening 12 in one of the ears 4 having the enlargement 13. Thus it will be seen that when the slides 3 are placed in the desired adjustment it is simply necessary to tighten the knurled screw 10 which binds the slide upon the scale.

The scale is further provided with the second set of slides or stops 14, which are mounted on the scale opposite the slides 3 and consist of the two depending lugs 15, one having the enlargement 16 in which is the threaded opening 17 and the other having the opening 18, both being in alinement and registering with the slot 2. Passing through the opening 18 and slot 2 is the knurled screw 19, the threaded end of which engages the threaded opening 17, thus it will be seen that by tightening the screws 19 the stops 14 will be securely held in the desired position.

In Figs. 4, 5, 6, and 7 of the drawings I have illustrated a modified form of my invention in which the upper and lower slides or stops 20 are movable on the scale and are capable of being secured in any desired position or adjustment. To secure or bind the slides or stops 20 in the desired adjustment I employ the knurled screw 21, which passes through the opening 22 in the lug 23, through the slot 2 and engages the threaded opening 24 in the enlarged lug 25, the tightening of the screw 21 binding the slides or stops upon the scale.

My invention may be used in a number of ways, some of which are as follows:—It may be used as an angle gage or square by placing the slides 3 and 14 in the desired adjustment and placing the ends of the slides to the edge of the work, illustrated by dotted line 26, and using the scale for ruling the line; it may be used as a center gage for round stock as will be clearly shown by the dotted circular line 26′, Fig. 1; it may be used in turning down a shaft or pin for any desired distance as is clearly shown by dotted lines 27, Fig. 1; it can be used in many other useful ways as will be apparent to those skilled in the art to which this invention appertains. Thus it will be readily apparent that I provide an invention which will be practical, desirable and cheap.

I claim:—

1. A geometrical instrument comprising a blade having a central longitudinal slot therein, a set of slide pieces formed with a pair of blades engaging ears having means engaging said slot to bind said pieces in any desired position and a projection on each piece having threaded openings therein, and scribing points having their inner ends threaded and engaging said threaded openings.

2. A geometrical instrument comprising a blade having graduations marked thereon and a central longitudinal slot therein, a set of slide pieces on each edge of the blade, each being formed with blade engaging ears having an opening therein registering with the slot in said blade, and clamping screws engaging said openings for clamping the slide pieces in the desired position, the slide pieces on one edge acting in conjunction with the slide pieces on the other for the purposes stated.

In testimony whereof I affix my signature in the presence of two witnesses.

ROBERT E. GARRETT.

Witnesses:
 EDGAR DRAKE,
 OLLIE E. FOUTCH.